United States Patent
LeBlanc

(10) Patent No.: US 8,565,127 B2
(45) Date of Patent: *Oct. 22, 2013

(54) VOICE-ACTIVITY DETECTION BASED ON FAR-END AND NEAR-END STATISTICS

(75) Inventor: Wilfred LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 12/947,594

(22) Filed: Nov. 16, 2010

(65) Prior Publication Data

US 2011/0058496 A1    Mar. 10, 2011

Related U.S. Application Data

(63) Continuation of application No. 11/846,399, filed on Aug. 28, 2007, now Pat. No. 7,835,311, which is a continuation of application No. 10/076,991, filed on Feb. 15, 2002, now Pat. No. 7,263,074, which is a continuation-in-part of application No. 09/522,185, filed on Mar. 9, 2000, now Pat. No. 7,423,983, which is a continuation-in-part of application No. 09/493,458, filed on Jan. 28, 2000, now Pat. No. 6,549,587, which is a continuation-in-part of application No. 09/454,219, filed on Dec. 9, 1999, now Pat. No. 6,882,711.

(51) Int. Cl.
*H04B 3/20* (2006.01)
*H04L 12/26* (2006.01)

(52) U.S. Cl.
USPC ...... 370/286; 250/227.21; 367/126; 367/132; 370/252; 370/435; 379/27.08; 379/406.08; 455/25; 455/439; 455/509; 455/562.1; 704/221

(58) Field of Classification Search
USPC .................. 250/227.2, 227.21; 367/126, 132; 370/252, 286, 352, 435; 379/27.08, 379/406.08; 455/25, 562.1, 439, 509; 704/221

See application file for complete search history.

(56) References Cited

U.S. PATENT DOCUMENTS

| | | | |
|---|---|---|---|
| 4,005,276 A | 1/1977 | Abramson et al. | |
| 4,215,252 A | 7/1980 | Onufry, Jr. | |
| 4,277,645 A | 7/1981 | May, Jr. | |
| 4,535,445 A | 8/1985 | Lane et al. | |
| 4,712,235 A | 12/1987 | Jones, Jr. | |
| 4,864,561 A * | 9/1989 | Ashenfelter et al. | 370/435 |

(Continued)

*Primary Examiner* — Gerald Gauthier
(74) *Attorney, Agent, or Firm* — Thomas | Horstemeyer, LLP

(57) ABSTRACT

Methods and apparatus of managing a communication system, wherein a decision regarding a level of activity at a first end is made based at least in part on the level of activity at the second end. In one embodiment, the energy level of a first-end audio signal is measured. The first end is declared voice-active if the first-end energy level is greater than or equal to a first threshold value. The first end is declared voice-inactive if the first-end energy level is less than the first threshold value. To determine the value of the first threshold value, the energy level of a second-end audio signal is measured. If the second-end energy level is greater than or equal to a second threshold value, the second end is declared voice-active, in which case the first threshold is maintained at a relatively high level. If the second-end energy level is less than the second threshold value, the second end is declared voice-inactive, in which case the first threshold is maintained at a relatively lower level.

8 Claims, 11 Drawing Sheets

(56) References Cited

U.S. PATENT DOCUMENTS

| | | | |
|---|---|---|---|
| 5,034,931 A * | 7/1991 | Wells | 367/126 |
| 5,471,528 A * | 11/1995 | Reesor | 379/406.08 |
| 5,488,737 A * | 1/1996 | Harbin et al. | 455/562.1 |
| 5,524,148 A | 6/1996 | Allen et al. | |
| 5,539,201 A * | 7/1996 | Liva et al. | 250/227.21 |
| 5,553,316 A | 9/1996 | Diepstraten et al. | |
| 5,598,466 A | 1/1997 | Graumann | |
| 5,619,566 A | 4/1997 | Fogel | |
| 5,649,055 A | 7/1997 | Gupta et al. | |
| 5,657,422 A | 8/1997 | Janiszewski et al. | |
| 5,661,699 A * | 8/1997 | Sutton | 367/132 |
| 5,680,508 A | 10/1997 | Liu | |
| 5,701,583 A * | 12/1997 | Harbin et al. | 455/25 |
| 5,706,394 A | 1/1998 | Wynn | |
| 5,822,726 A | 10/1998 | Taylor et al. | |
| 5,884,177 A * | 3/1999 | Hanley | 455/439 |
| 5,920,834 A | 7/1999 | Sih et al. | |
| 5,937,381 A | 8/1999 | Huang et al. | |
| 5,956,673 A * | 9/1999 | Weaver et al. | 704/221 |
| 5,963,901 A | 10/1999 | Vahatalo et al. | |
| 5,970,447 A | 10/1999 | Ireton | |
| 5,983,114 A * | 11/1999 | Yao et al. | 455/509 |
| 5,991,718 A | 11/1999 | Malah | |
| 6,021,334 A | 2/2000 | Aste et al. | |
| 6,084,947 A * | 7/2000 | Efron et al. | 379/27.08 |
| 6,134,524 A | 10/2000 | Peters et al. | |
| 6,154,721 A | 11/2000 | Sonnic | |
| 6,182,035 B1 | 1/2001 | Mekuria | |
| 6,223,154 B1 | 4/2001 | Nicholls et al. | |
| 6,249,757 B1 | 6/2001 | Cason | |
| 6,327,276 B1 | 12/2001 | Robert et al. | |
| 6,351,731 B1 | 2/2002 | Anderson et al. | |
| 6,411,928 B2 | 6/2002 | Tsurufuji et al. | |
| 6,453,285 B1 | 9/2002 | Anderson et al. | |
| 6,487,181 B1 | 11/2002 | Johnson et al. | |
| 6,556,967 B1 | 4/2003 | Nelson et al. | |
| 6,606,593 B1 | 8/2003 | Jarvinen et al. | |
| 6,618,701 B2 | 9/2003 | Piket et al. | |
| RE38,269 E | 10/2003 | Liu | |
| 6,785,564 B1 | 8/2004 | Quigley et al. | |
| 6,859,444 B1 | 2/2005 | Vancraeynest | |
| 6,912,209 B1 | 6/2005 | Thi et al. | |
| 6,967,946 B1 | 11/2005 | Tackin et al. | |
| 7,136,812 B2 | 11/2006 | Manjunath et al. | |
| 7,263,074 B2 * | 8/2007 | LeBlanc | 370/286 |
| 7,460,507 B2 | 12/2008 | Kubler et al. | |
| 7,835,311 B2 * | 11/2010 | LeBlanc | 370/286 |
| 2002/0075856 A1 * | 6/2002 | LeBlanc | 370/352 |
| 2008/0049647 A1 * | 2/2008 | LeBlanc | 370/286 |
| 2011/0058496 A1 * | 3/2011 | LeBlanc | 370/252 |

* cited by examiner

VOICE-ACTIVITY DETECTION BASED ON FAR-END AND NEAR-END STATISTICS

CROSS-REFERENCE TO RELATED APPLICATIONS

The present application is a continuation of U.S. patent application Ser. No. 11/846,399, filed Aug. 28, 2007, which is a continuation of U.S. patent application Ser. No. 10/076,991, filed Feb. 15, 2002, now U.S. Pat. No. 7,263,074, which is a continuation-in-part of U.S. patent application Ser. No. 09/522,185, filed Mar. 9, 2000, now U.S. Pat. No. 7,423,983, which is a continuation-in-part of application Ser. No. 09/493,458, filed Jan. 28, 2000, now U.S. Pat. No. 6,549,587, which is a continuation-in-part of application Ser. No. 09/454,219, filed Dec. 9, 1999, now U.S. Pat. No. 6,882,711, priority of each application which is hereby claimed under 35 U.S.C. §120. All these applications are expressly incorporated herein by reference as though set forth in full.

FIELD OF THE INVENTION

The present invention relates generally to telecommunications systems, and more particularly, to a system for interfacing telephony devices with packet-based networks.

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, an integrated system for interfacing various telephony devices over packet-based networks has been difficult due to the different modulation schemes of the telephony devices. Accordingly, it would be advantageous to have an efficient and robust integrated system for the exchange of voice, fax data and modem data between telephony devices and packet-based networks.

SUMMARY OF THE INVENTION

One aspect of the present invention is directed to a method of managing a communication system having first and second ends. Pursuant to the method, a level of activity at the second end is monitored. A decision regarding a level of activity at the first end is made based at least in part on the level of activity at the second end.

In one embodiment of the above method, the energy level of a first-end audio signal is measured. The first end is declared voice-active if the first-end energy level is greater than or equal to a first threshold value. The first end is declared voice-inactive if the first-end energy level is less than the first threshold value. To determine the value of the first threshold value, the energy level of a second-end audio signal is measured. If the second-end energy level is greater than or equal to a second threshold value, the second end is declared voice-active, in which case the first threshold is maintained at a relatively high level. If the second-end energy level is less than the second threshold value, the second end is declared voice-inactive, in which case the first threshold is maintained at a relatively lower level.

In another embodiment of the present invention, a parameter of a first-end audio signal is measured. The parameter is indicative of the level of voice activity at the first end. The first end is declared voice-active if the measured parameter is greater than or equal to a threshold value. The first end is declared voice-inactive if the first-end power level is less than the threshold value. To determine the value of the first threshold value, spectral characteristics of the first-end audio signal and of a second-end audio signal are compared to each other. The threshold value is maintained at a relatively low level if the spectral characteristics of the first-end signal are equal or approximately equal to the spectral characteristics of the second-end signal. The threshold value is maintained at a relatively higher level if the spectral characteristics of the first-end signal are not equal nor approximately equal to the spectral characteristics of the second-end signal.

In another method of managing a communication system according to the present invention, a first-end signal is monitored. A level of background noise present in the first-end signal is estimated. A second-end signal is also monitored. The background noise estimate is manipulated based upon a characteristic of the second-end signal. In an illustrative embodiment, the first-end and second-end signals are audio signals and the background noise estimate is frozen at a present value or adjusted more slowly when the second-end signal is active.

Another aspect of the present invention is directed to a communication system having first and second ends. The communication system includes a signal estimator and an activity detector. The signal estimator estimates a level of activity at the second end. The activity detector is capable of making a decision regarding a level of activity at the first end made based at least in part on the estimated level of activity at the second end.

In one embodiment of the above-referenced communication system, a voice activity detector measures the energy level of a first-end audio signal. The voice activity detector declares the first end voice-active if the first-end energy level is greater than or equal to a first threshold value. The voice activity detector declares the first end voice-inactive if the first-end energy level is less than the first threshold value. To determine the value of the first threshold value, the voice activity detector measures the energy level of a second-end audio signal. If the second-end energy level is greater than or equal to a second threshold value, the voice activity detector declares the second end voice-active, in which case the first threshold is maintained at a relatively high level. If the second-end energy level is less than the second threshold value, the voice activity detector declares the second end voice-inactive, in which case the first threshold is maintained at a relatively lower level.

In another embodiment of the present invention, a voice activity detector measures a parameter of a first-end audio signal. The parameter is indicative of the level of voice activity at the first end. The voice activity detector declares the first end voice-active if the measured parameter is greater than or equal to a threshold value. The voice activity detector declares the first end voice-inactive if the first-end power level is less than the threshold value. To determine the value of the first threshold value, the voice activity detector compares the spectral characteristics of the first-end audio signal and of a second-end audio signal to, each other. The voice activity detector maintains the threshold value at a relatively low level if the spectral characteristics of the first-end signal are equal or approximately equal to the spectral characteristics of the second-end signal. The voice activity detector maintains the threshold value at a relatively higher level if the spectral characteristics of the first-end signal are not equal nor approximately equal to the spectral characteristics of the second-end signal.

Another embodiment of the present invention is directed toward a background noise estimator having first and second monitoring means, estimating means and manipulating means. The first monitoring means monitors a first-end signal. The estimating means estimates a level of background noise present in the first-end signal. The second monitoring means monitors a second-end signal. The manipulating means manipulates the background noise estimate based upon a characteristic of the second-end signal. In an illustrative embodiment, the first-end and second-end signals are audio signals and the manipulating means adjusts the background noise estimate or freezes it at a present value when the second-end signal is active.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

An Embodiment of a Signal Processing System

In a preferred embodiment of the present invention, a signal processing system is employed to interface telephony devices with packet-based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described preferred embodiment of the signal processing system can be implemented with a variety of technologies including, by way of example, embedded communications software that enables transmission of information, including voice, fax and modem data over packet-based networks. The embedded communications software is preferably run on programmable digital signal processors (DSPs) and is used in gateways, cable modems, remote access servers, PBXs, and other packet-based network appliances.

Figure 1:
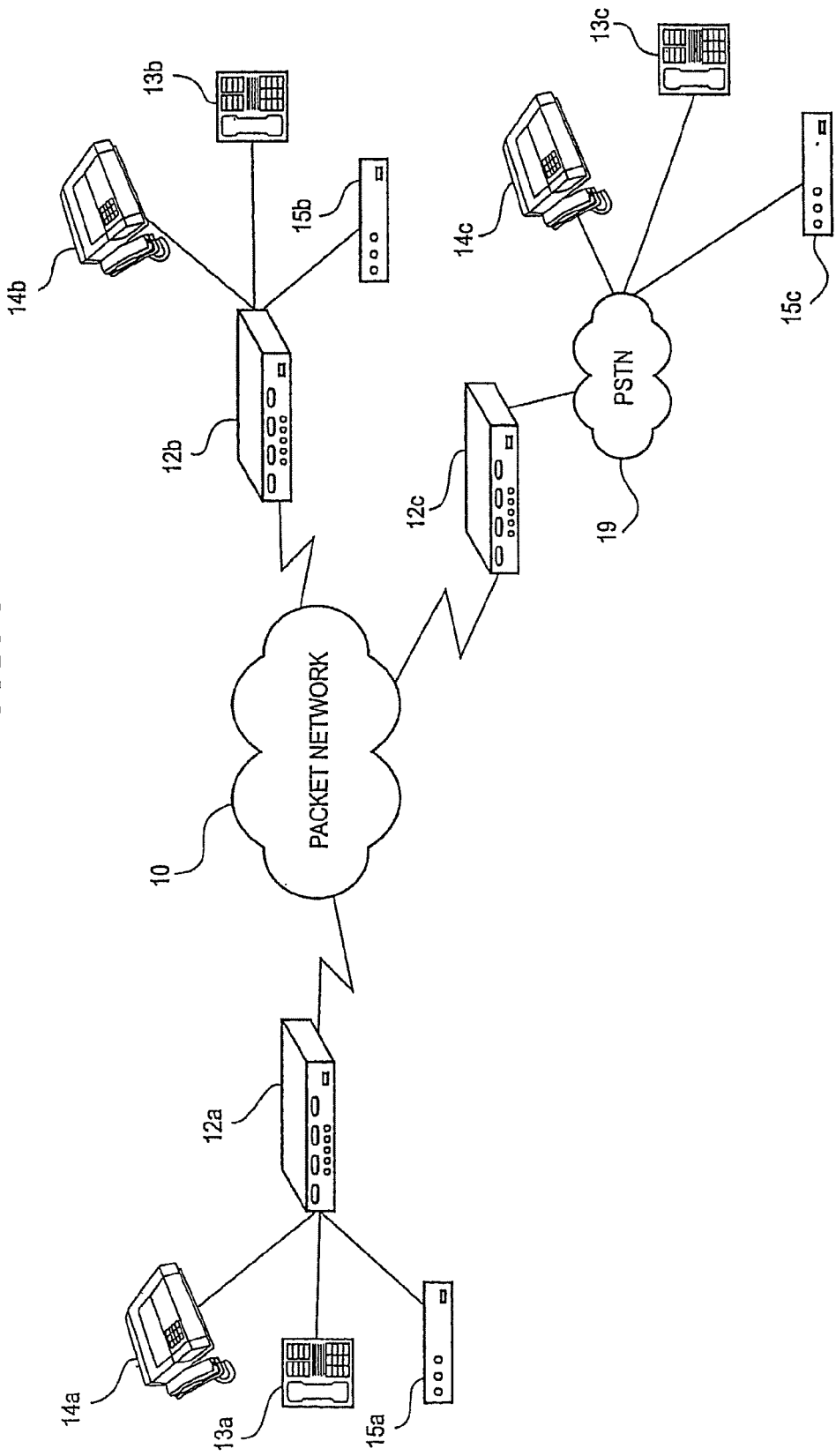
FIG. 1 is a block diagram of a packet-based infrastructure providing a communication medium with a number of telephony devices in accordance with a preferred embodiment of the present invention.

An exemplary topology is shown in FIG. 1 with a packet-based network 10 providing a communication medium between various telephony devices. Each network gateway 12a, 12b, 12c includes a signal processing system which provides an interface between the packet-based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. As will be appreciated by those skilled in the art, each network gateway 12a, 12b, 12c could support a variety of different telephony arrangements. By way of example, each network gateway might support any number telephony devices and/or circuit-switched/packet-based networks including, among others, analog telephones, ethernet phones, fax machines, data modems, PSTN lines (Public Switching Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet-based system.

Figure 1A:
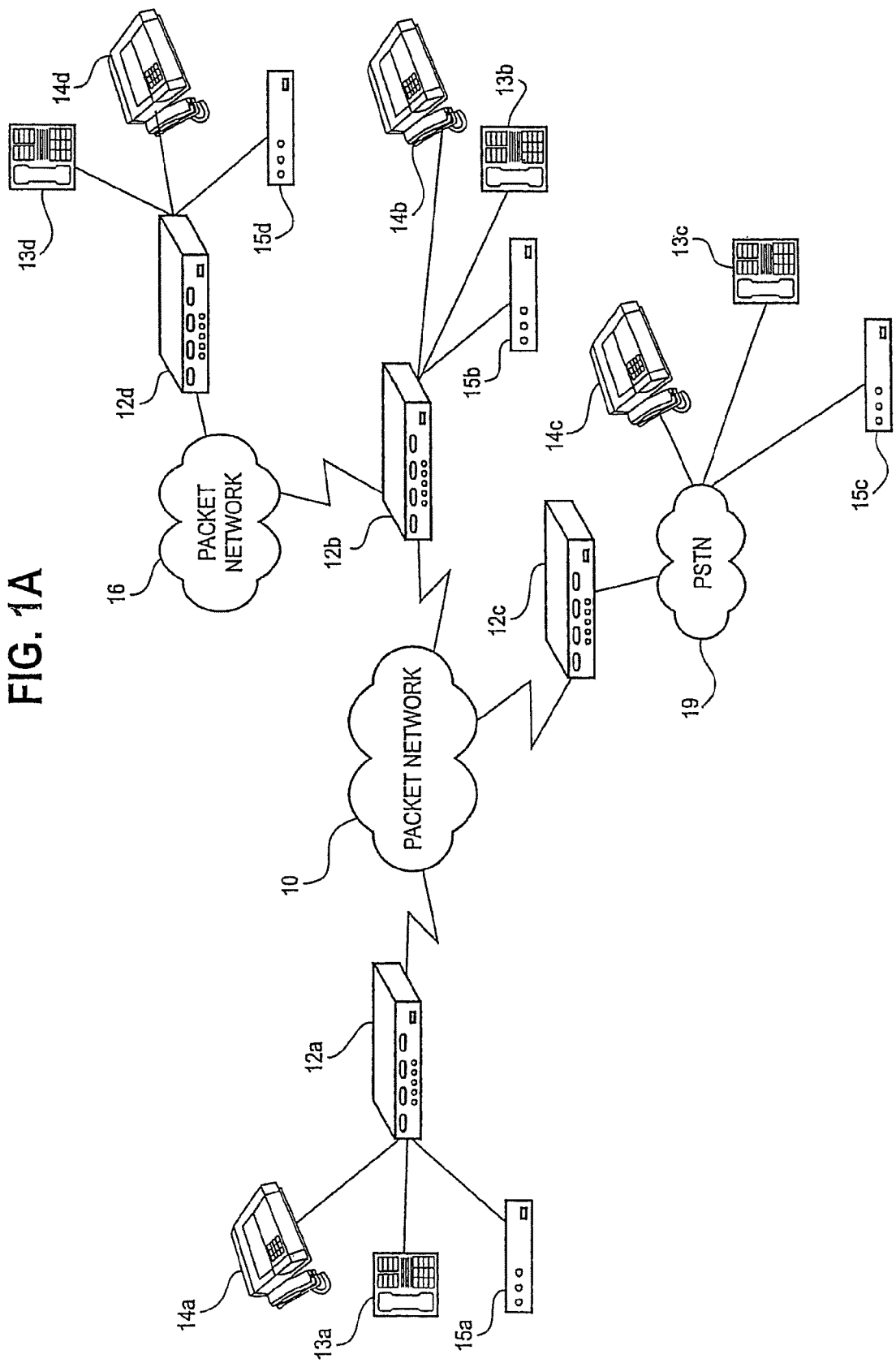
FIG. 1A is a block diagram of a packet-based infrastructure providing a communication medium with a number of telephony devices in accordance with a preferred embodiment of the present invention.

Another exemplary topology is shown in FIG. 1A. The topology of FIG. 1A is similar to that of FIG. 1 but includes a second packet-based network 16 that is connected to packet-based network 10 and to telephony devices 13b, 14b and 15b via network gateway 12b. The signal processing system of network gateway 12b provides an interface between packet-based network 10 and packet-based network 16 in addition to an interface between packet-based networks 10, 16 and telephony devices 13b, 14b and 15b. Network gateway 12d includes a signal processing system which provides an interface between packet-based network 16 and fax machine 14d, telephone 13d, and modem 15d.

Figure 2:
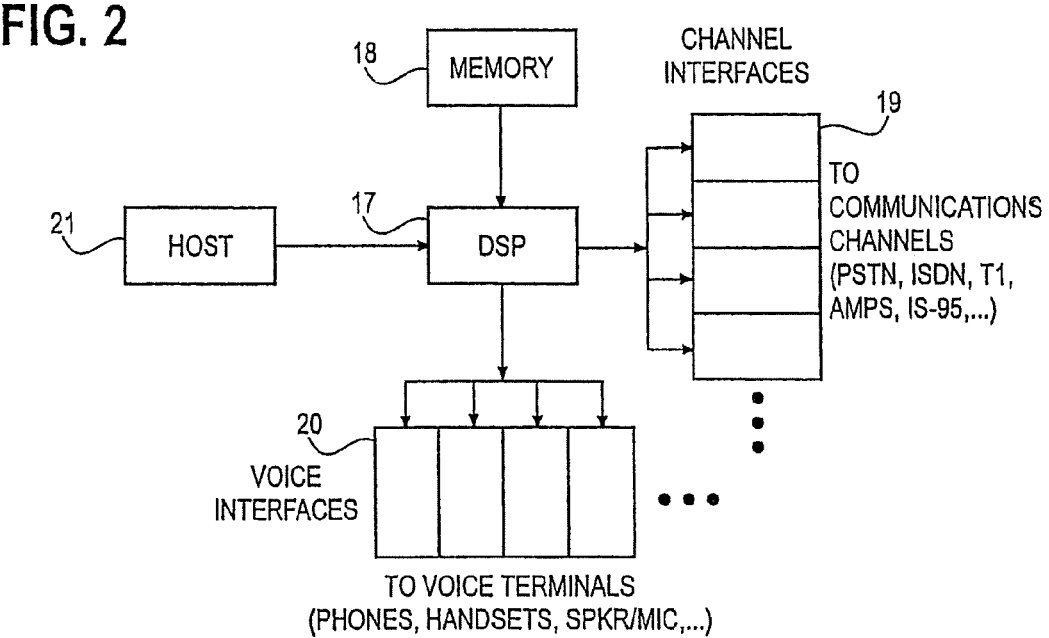
FIG. 2 is a block diagram of a signal processing system implemented with a programmable digital signal processor (DSP) software architecture in accordance with a preferred embodiment of the present invention.

The exemplary signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet-based network. The telephony interfaces 23 can be connected to a circuit-switched network interface such as a PSTN system, or directly to any telephony device. The programmable DSP is effectively hidden within the embedded communications software layer. The software layer binds all core DSP algorithms together, interfaces the DSP hardware to the host, and provides low level services such as the allocation of resources to allow higher level software programs to run.

Figure 3:
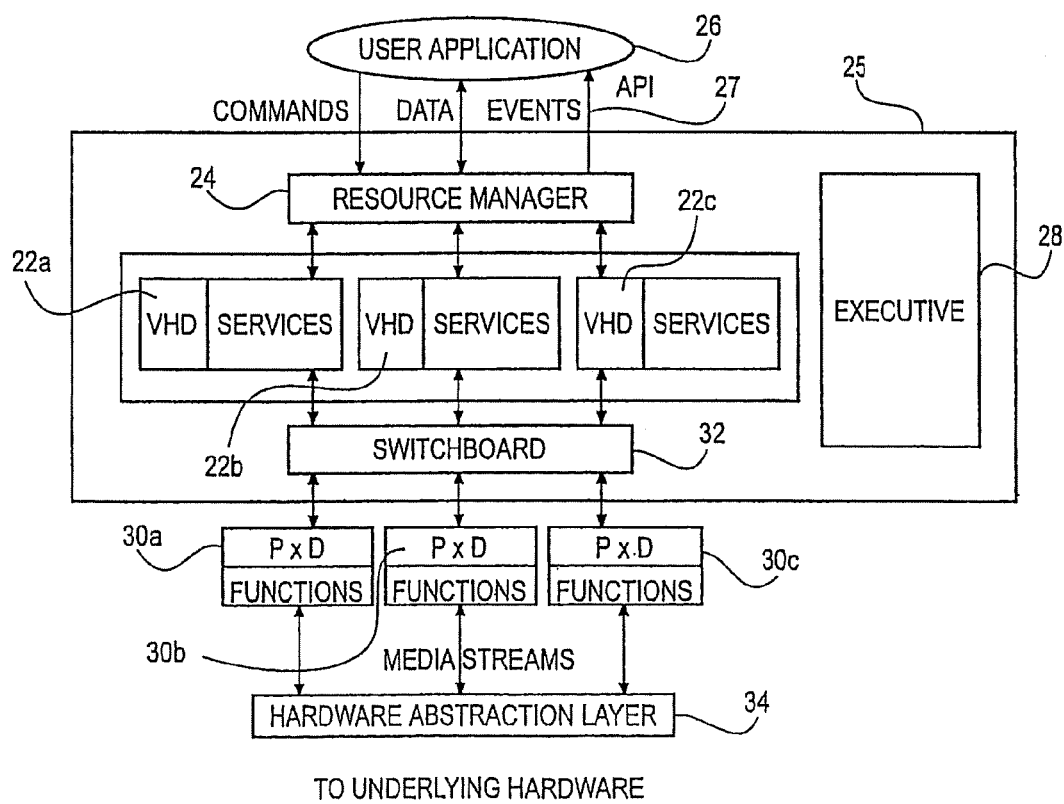
FIG. 3 is a block diagram of the software architecture operating on the DSP platform of FIG. 2 in accordance with a preferred embodiment of the present invention.

An exemplary multi-layer software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. Operating below the DSP server layer are a number of physical devices (PXD) 30a, 30b, 30c. Each PXD provides an interface between the DSP server 25 and an external telephony device (not shown) via a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDs) 22a, 22b, 22c. The VHDs are a collection of software objects that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel with a number of different telephony devices. Multiple channel capability can be achieved by adding VHDs to the DSP server 25. The resource manager 24 dynamically controls the creation and deletion of VHDs and services.

A switchboard 32 in the DSP server 25 dynamically interconnects the PXDs 30a, 30b, 30c with the VHDs 22a, 22b, 22c. Each PXD 30a, 30b, 30c is a collection of software objects which provide signal conditioning for one external telephony device. For example, a PXD may provide volume and gain control for signals from a telephony device prior to communication with the switchboard 32. Multiple telephony functionalities can be supported on a single channel by connecting multiple PXDs, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 interfaces directly with the underlying DSP 17 hardware (see FIG. 2) and exchanges telephony signals between the external telephony devices and the PXDs. The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

The exemplary software architecture described above can be integrated into numerous telecommunications products. In an exemplary embodiment, the software architecture is designed to support telephony signals between telephony devices (and/or circuit-switched networks) and packet-based networks. A network VHD (NetVHD) is used to provide a single channel of operation and provide the signal processing services for transparently managing voice, fax, and modem data across a variety of packet-based networks. More particularly, the NetVHD encodes and packetizes DTMF, voice, fax, and modem data received from various telephony devices and/or circuit-switched networks and transmits the packets to the user application layer. In addition, the NetVHD disassembles DTMF, voice, fax, and modem data from the user application layer, decodes the packets into signals, and transmits the signals to the circuit-switched network or device.

Figure 4:
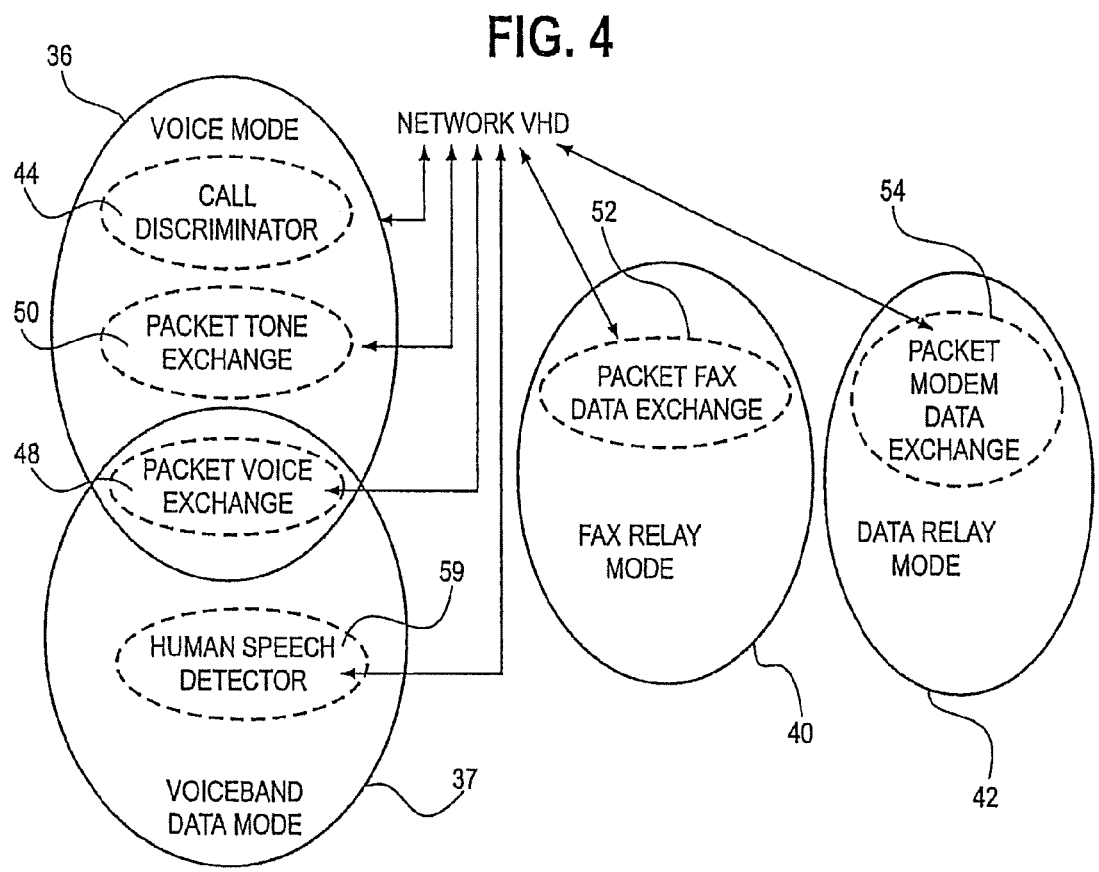
FIG. 4 is a state machine diagram of the operational modes of a virtual device driver for packet-based network applications in accordance with a preferred embodiment of the present invention.

An exemplary embodiment of the NetVHD operating in the described software architecture is shown in FIG. 4. The NetVHD includes four operational modes, namely voice mode 36, voiceband data mode 37, fax relay mode 40, and data relay mode 42. In each operational mode, the resource manager invokes various services. For example, in the voice mode 36, the resource manager invokes call discrimination 44, packet voice exchange 48, and packet tone exchange 50. The packet voice exchange 48 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (December 1990)—40, 32, 24, 16 kbit/s Adaptive Differential Pulse Code Modulation (ADPCM)), G.729A 8 kbps (Annex A (October 1996) to ITU Recommendation G.729—Coding of speech at 8 kbit/s using conjugate structure algebraic-code-excited linear-prediction (CS-ACELP) B Annex A: Reduced complexity 8 kbit/s CS-ACELP speech codec), and G.723 5.3/6.3 kbps (ITU Recommendation G.723.1 (March 1996)—Dual rate coder for multimedia communications transmitting at 5.3 and 6.3 kbit/s). The contents of each of the foregoing ITU Recommendations being incorporated herein by reference as if set forth in full. The packet voice exchange 48 is common to both the voice mode 36 and the voiceband data mode 37. In the voiceband data mode 37, the resource manager invokes the packet voice exchange 48 for exchanging transparently data without modification (other than packetization) between the telephony device (or circuit-switched network) and the packet-based network. This is typically used for the exchange of fax and modem data when bandwidth concerns are minimal as an alternative to demodulation and remodulation. During the voiceband data mode 37, the human speech detector service 59 is also invoked by the resource manager. The human speech detector 59 monitors the signal from the near end telephony device for speech. In the event that speech is detected by the human speech detector 59, an event is forwarded to the resource manager which, in turn, causes the resource manager to terminate the human speech detector service 59 and invoke the appropriate services for the voice mode 36 (i.e., the call discriminator, the packet tone exchange, and the packet voice exchange).

In the fax relay mode 40, the resource manager invokes a fax exchange 52 service. The packet fax exchange 52 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet data exchange 54 service in the data relay mode 42. The packet data exchange 52 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet-based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

The Voice Mode

Figure 5:
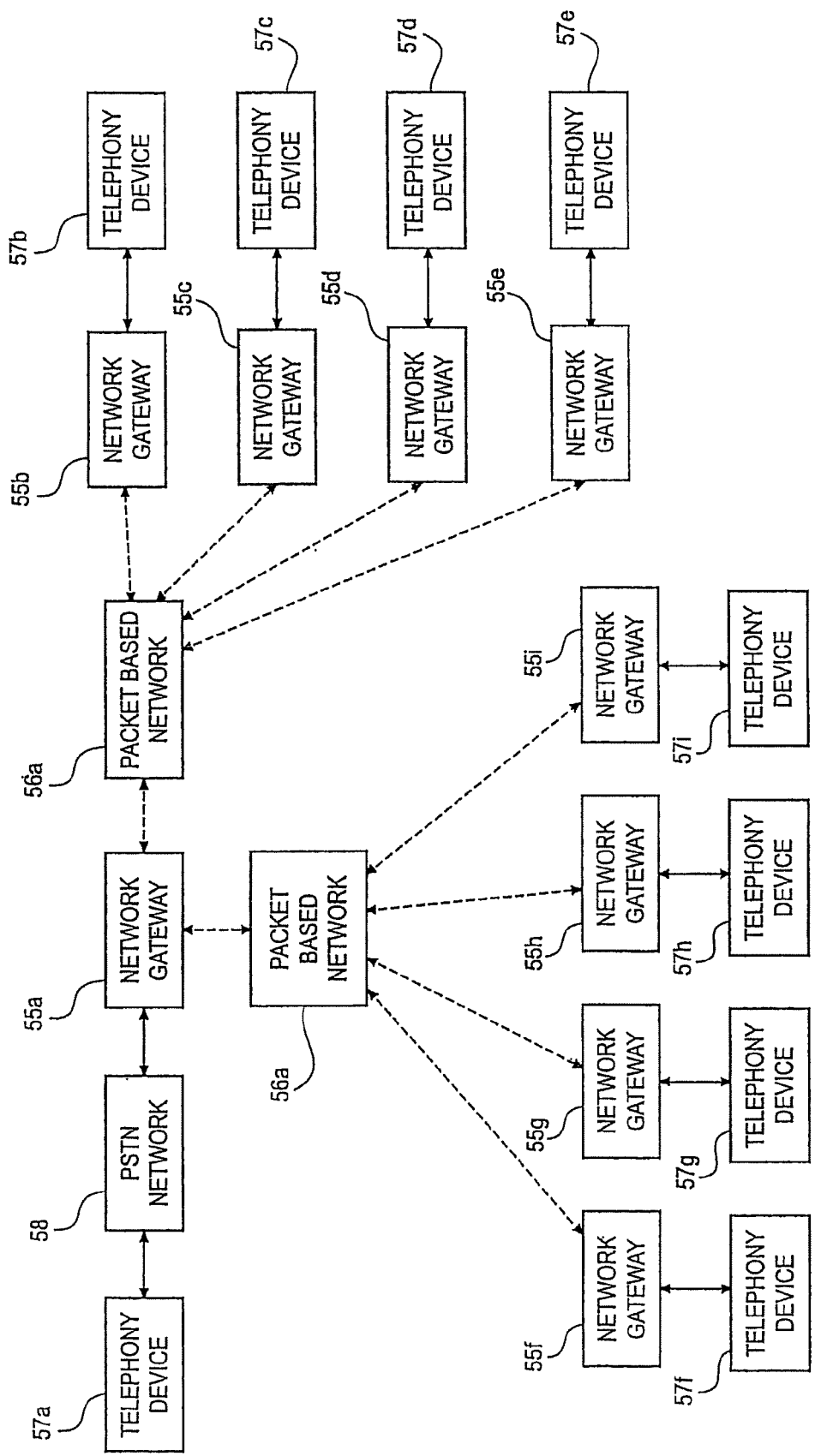
FIG. 5 is a block diagram of several signal processing systems in the voice mode for interfacing between a switched circuit network and a packet-based network in accordance with a preferred embodiment of the present invention.

Voice mode provides signal processing of voice signals. As shown in the exemplary embodiment depicted in FIG. 5, voice mode enables the transmission of voice over a packet-based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems. Network gateway 55*a* supports the exchange of voice between a traditional circuit-switched network 58 and packet-based networks 56(*a*) and 56(*b*). Network gateways 55*b*, 55*c*, 55*d*, 55*e* support the exchange of voice between packet-based network 56*a* and a number of telephony devices 57*b*, 57*c*, 57*d*, 57*e*. In addition, network gateways 55*f*, 55*g*, 55*h*, 55*i* support the exchange of voice between packet-based network 56*b* and telephony devices 57*f*, 57*g*, 57*h*, 57*i*. Telephony devices 57*a*, 57*b*, 57*c*, 57*d*, 57*e*, 55*f*, 55*g*, 55*h*, 55*i* can be any type of telephony device including telephones, facsimile machines and modems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 6:
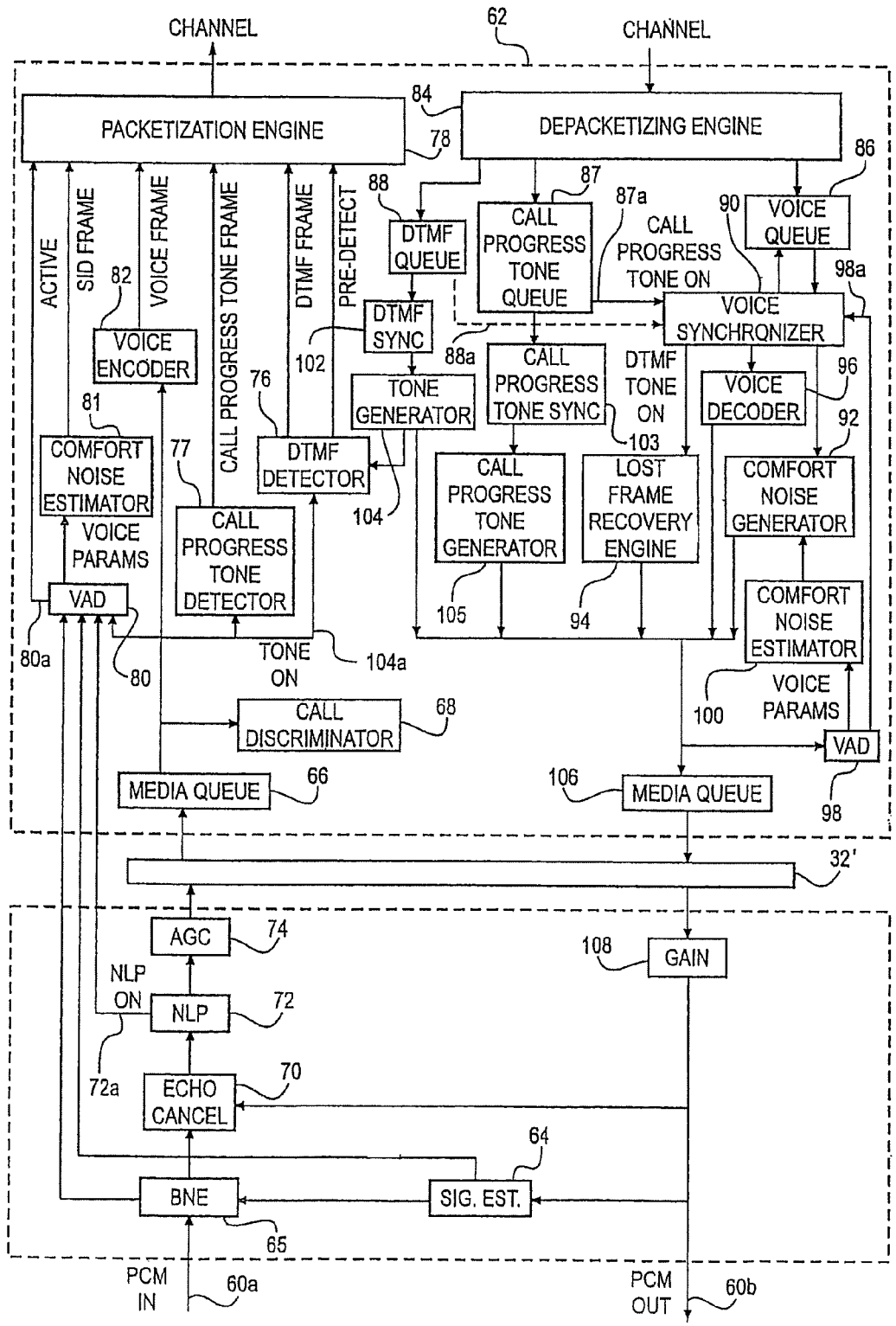
FIG. 6 is a system block diagram of a signal processing system operating in a voice mode in accordance with a preferred embodiment of the present invention.

The services invoked by the network VHD in the voice mode and the associated PXD is shown schematically in FIG. 6. In the described exemplary embodiment, the PXD 60 provides two way communication with a telephone or a circuit-switched network, such as a PSTN line (e.g. DS0) carrying a 64 kb/s pulse code modulated (PCM) signal, i.e., digital voice samples.

In an illustrative embodiment of the present invention, the incoming PCM signal 60*a* is initially processed by a background noise estimator (BNE) 65 that estimates the level of background noise present in the near-end PCM signal 60*a*. The background noise estimator 65 provides the estimate of the background noise to the voice activity detector (VAD) 80 for use in determining whether the near-end signal is active.

The incoming PCM signal 60a is then processed by PXD 60 to remove far-end echo. As the name implies, echo in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 70 is used to remove echo from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which in the absence of near end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70, however, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated. After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz, a 1100 Hz. tone or V.21 modulated HDLC flags are present. As described above with reference to FIG. 4, if either tone or HDLC flags are detected, the voice mode services are terminated and the appropriate service for fax or modem operation is initiated. In the absence of a 2100 Hz, a 1100 Hz. tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72a passed from the NLP 72 to the VAD 80.

The voice encoder 82, operating under the packet voice exchange, can be a straight 16 bit PCM encoder or any voice encoder which supports one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as though set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet-based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a depacketizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The depacketizing engine 84 identifies the type of packets received from the host (i.e., voice packet, DTMF packet, call progress tone packet, SID packet), transforms them into frames which are protocol independent. The depacketizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit-switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 92 from the voice parameters in the SID packets buffered in the voice queue 86. However, for some protocols, namely, FRF-11, the SID packets are optional, and other far end users may not support SID packets at all. In these systems, the voice synchronizer 90 must continue to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98*a* fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 88*a* passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104*a* passed between the tone generator 104 and the DTMF detector 76. Alternatively, the NLP 72 can be activated while generating DTMF tones.

When call progress tone packets arrive, they are depacketized by the depacketizing engine 84. Call progress tone frames at the output of the depacketizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87*a* passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

Voice Activity Detector

In an exemplary embodiment, the VAD, in either the encoder system or the decoder system, can be configured to operate in multiple modes so as to provide system tradeoffs between voice quality and bandwidth requirements. In a first mode, the VAD is always disabled and declares all digital voice samples as active speech. This mode is applicable if the signal processing system is used over a TDM network, a network which is not congested with traffic, or when used with PCM (ITU Recommendation G.711 (1988)—Pulse Code Modulation (PCM) of Voice Frequencies, the contents of which is incorporated herein by reference as if set forth in full) in a PCM bypass mode for supporting data or fax modems.

In a second "transparent" mode, the voice quality is indistinguishable from the first mode. In transparent mode, the VAD identifies digital voice samples with an energy below the threshold of hearing as inactive speech. In an illustrative embodiment, the threshold is adjustable between −65 and −62 dBm with a default value of −62 dBm. The thresholds in all modes are adaptive, based, for example, on background noise level. But in an illustrative embodiment, the thresholds in each mode are limited between a minimum and a maximum value. The transparent mode may be used if voice quality is much more important than bandwidth. This may be the case, for example, if a G.711 voice encoder (or decoder) is used. It will be noted that other parameters can also be utilized, in lieu of the energy level parameter, to determine whether the signal is active or inactive. For example, in an illustrative embodiment, the power level of the signal is used for this purpose.

In a third "conservative" mode, the VAD identifies low level (but audible) digital voice samples as inactive, but will be fairly conservative about discarding the digital voice samples. A low percentage of active speech will be clipped at the expense of slightly higher transmit bandwidth. In the conservative mode, a skilled listener may be able to determine that voice activity detection and comfort noise generation is being employed. In an illustrative embodiment, the threshold for the conservative mode is adjustable between −60 and −50 dBm with a default value of −50 dBm.

In a fourth "aggressive" mode, bandwidth is at a premium. The VAD is aggressive about discarding digital voice samples which are declared inactive. This approach will result in speech being occasionally clipped, but system bandwidth will be vastly improved. In an illustrative embodiment, the threshold for the aggressive mode is adjustable between −56 and −42 dBm with a default value of −42 dBm.

The transparent mode is typically the default mode when the system is operating with 16 bit PCM, companded PCM (G.711) or adaptive differential PCM (ITU Recommendations G.726 (December 1990)—40, 32, 24, 16 kbit/s Using Low-Delay Code Exited Linear Prediction, and G.727 (December 1990)—5-, 4-, 3-, and 2-Sample Embedded Adaptive Differential Pulse Code Modulation). In these instances, the user is most likely concerned with high quality voice since a high bit-rate voice encoder (or decoder) has been selected. As such, a high quality VAD should be employed. The transparent mode should also be used for the VAD operating in the decoder system since bandwidth is not a concern (the VAD in the decoder system is used only to update the comfort noise parameters). The conservative mode could be used with ITU Recommendation G.728 (September 1992)—Coding of Speech at 16 kbit/s Using Low-Delay Code Excited Linear Prediction, G.729, and G.723.1. For systems demanding high bandwidth efficiency, the aggressive mode can be employed as the default mode.

The mechanism in which the VAD detects digital voice samples that do not contain active speech can be implemented in a variety of ways. One such mechanism entails monitoring the energy level of the digital voice samples over short periods (where a period length is typically in the range of about 10 to 30 msec). If the energy level exceeds a fixed threshold, the digital voice samples are declared active, otherwise they are declared inactive. The transparent mode can be obtained when the threshold is set to the threshold level of hearing.

Alternatively, the threshold level of the VAD can be adaptive and the background noise energy can be tracked. If the energy in the current period is sufficiently larger than the background noise estimate by the background noise estimator 65, the digital voice samples are declared active, otherwise they are declared inactive. The VAD may also freeze the comfort noise estimator or extend the range of active periods (hangover). This type of VAD is used in GSM (European Digital Cellular Telecommunications System; Half rate Speech Part 6: Voice Activity Detector (VAD) for Half Rate Speech Traffic Channels (GSM 6.42), the contents of which is incorporated herein by reference as if set forth in full) and QCELP (W. Gardner, P. Jacobs, and C. Lee, "QCELP: A Variable Rate Speech Coder for CDMA Digital Cellular," in *Speech and Audio Coding for Wireless and Network Applications*, B. S. atal, V. Cuperman, and A. Gersho (eds)., the contents of which is incorporated herein by reference as if set forth in full).

In a VAD utilizing an adaptive threshold level, speech parameters such as the zero crossing rate, spectral tilt, energy and spectral dynamics are measured and compared to stored values for noise. If the parameters differ significantly from the stored values, it is an indication that active speech is present even if the energy level of the digital voice samples is low.

When the VAD operates in the conservative or transparent mode, measuring the energy of the digital voice samples can be sufficient for detecting inactive speech. However, the spectral dynamics of the digital voice samples against a fixed threshold may be useful in discriminating between long voice segments with audio spectra and long term background noise. In an exemplary embodiment of a VAD employing spectral analysis, the VAD performs auto-correlations using Itakura or Itakura-Saito distortion to compare long term estimates based on background noise to short term estimates based on a period of digital voice samples. In addition, if supported by the voice encoder, line spectrum pairs (LSPs) can be used to compare long term LSP estimates based on background noise to short terms estimates based on a period of digital voice samples. Alternatively, FFT methods can be are used when the spectrum is available from another software module.

Preferably, hangover should be applied to the end of active periods of the digital voice samples with active speech. Hangover bridges short inactive segments to ensure that quiet trailing, unvoiced sounds (such as /s/), are classified as active. The amount of hangover can be adjusted according to the mode of operation of the VAD. If a period following a long active period is clearly inactive (i.e., very low energy with a spectrum similar to the measured background noise) the length of the hangover period can be reduced. Generally, a range of about 40 to 300 msec of inactive speech following an active speech burst will be declared active speech due to hangover.

Typically, the parties to a telephone communication tend not to talk at the same time. Therefore, in an illustrative embodiment of the present invention, the sensitivity of the VAD 80 is adjusted based on the level of voice activity at the far-end. If far-end speech is detected, the VAD 80 operates at a lower sensitivity level. A signal estimator 64 samples the outgoing far-end PCM signal 60b and provides a far-end activity signal to the VAD 80. The far-end activity signal provided to the VAD 80 is indicative of an estimated level of activity in the far-end signal 60b. If the energy level of the far-end signal is greater than or equal to a specified far-end threshold, the near-end threshold (the threshold used to determine whether the near-end signal 60a is voice-active) is maintained at a higher level than when the far-end signal is below the far-end threshold.

Figure 7:
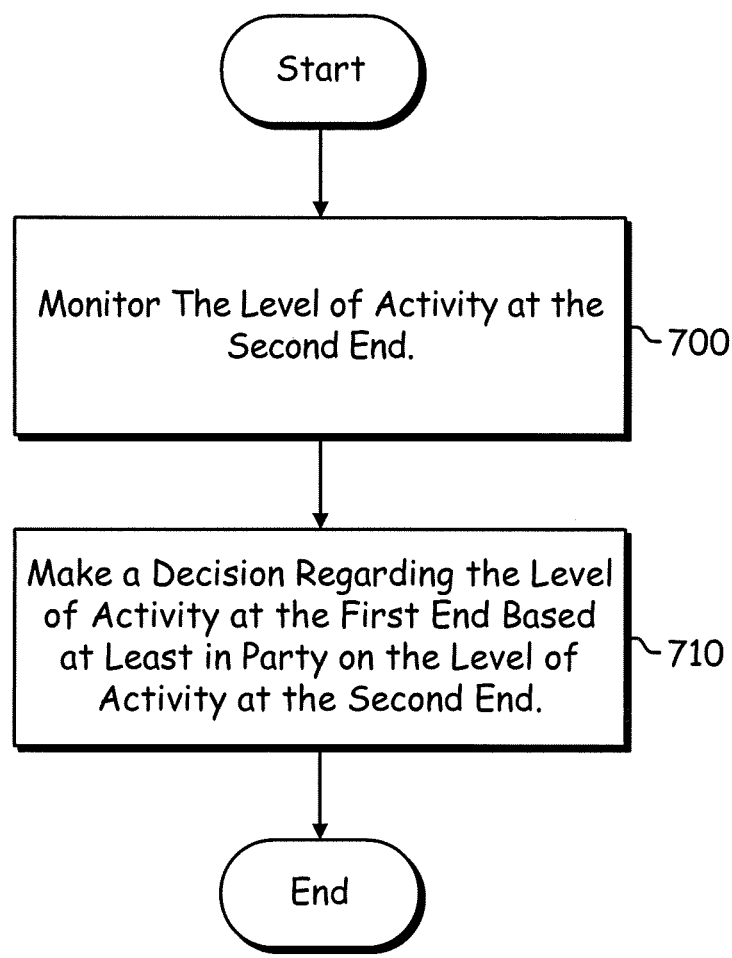
FIG. 7 is a flowchart representing a method of managing a communication system according to an illustrative embodiment of the present invention.

FIG. 7 is a flowchart representing a method of managing a communication system according to an illustrative embodiment of the present invention. At step 700, a level of activity at the second end is monitored. At step 710, a decision regarding a level of activity at the first end is made based at least in part on the level of activity at the second end. In an exemplary embodiment, step 710 involves deciding whether the near end is voice-active or voice-inactive based at least in part on the level of voice activity at the far end.

Figure 8:
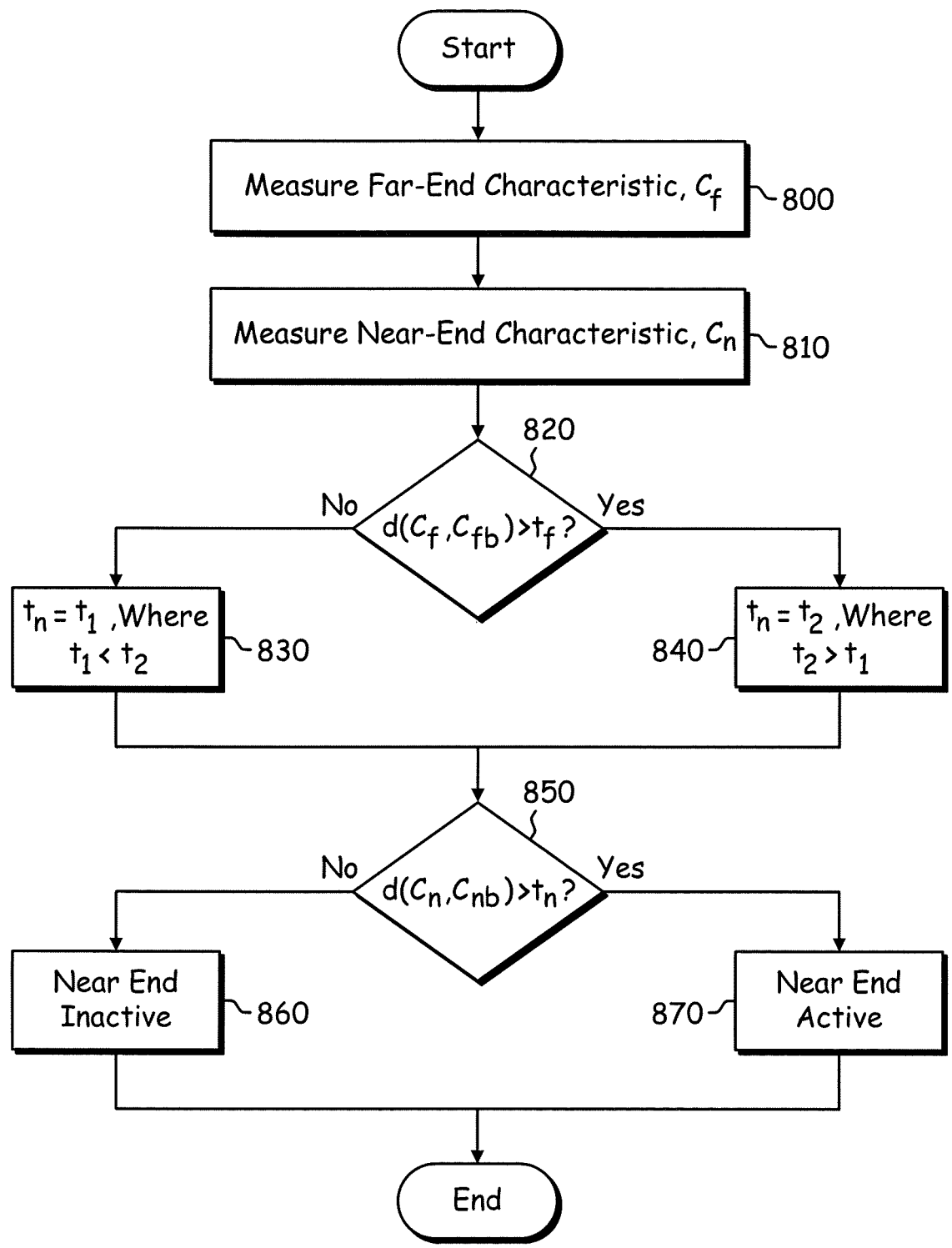
FIG. 8 is a flowchart representing a method of managing a communication system according to an illustrative embodiment of the present invention.

FIG. 8 is a flowchart representing a method of managing a communication system according to an illustrative embodiment of the method represented in FIG. 7. At step 800, a signal characteristic $C_f$ of the far-end signal 60b is measured. At step 810, a signal characteristic $C_n$ of the near-end signal 60a is measured. In an illustrative embodiment of the present invention, the signal characteristics employed are characteristics that are indicative of the magnitude of the respective signals. For example, in various embodiments, energy level, power level, spectral characteristics and non-linear characteristics are employed as the signal characteristics. At decision block 820, a distortion value $d(C_f, C_{fb})$ indicative of a distortion between the far-end signal characteristic and the corresponding far-end background noise spectral characteristic is evaluated. If the distortion value $d(C_f, C_{fb})$ is less than a predetermined far-end threshold $t_f$, the far end is deemed inactive and a near-end threshold, $t_n$, is set to a first threshold level, $t_1$, as shown at step 830. At step 840, if the distortion value $d(C_f, C_{fb})$ is greater than $t_f$, the far end is deemed active and the near-end threshold, $t_n$, is set to a second threshold level, $t_2$, which represents a higher threshold than the first threshold level $t_1$. At decision block 850, a distortion value $d(C_n, C_{nb})$ indicative of a distortion between the near-end signal characteristic and the corresponding near-end background noise signal characteristic is compared to the near-end threshold, $t_n$. If the distortion value $d(C_n, C_{nb})$ is less $t_n$, the near-end is declared inactive, as shown at step 860. At step 870, if the distortion value $d(C_n, C_{nb})$ is greater than $t_n$, the near-end is declared active. In an illustrative embodiment, the second near-end threshold $t_2$ is approximately 10 dBm greater than the first near-end threshold $t_1$.

The incoming near-end PCM signal 60a can contain far-end echo that will have an effect on the VAD's determination of the activity of the near end. If echo is significantly present in the near-end signal, the spectral characteristics of the first-end signal will mirror the spectral characteristics of the far-end signal. Therefore, in another illustrative embodiment of the present invention, the VAD 80 determines and compares spectral characteristics of the incoming near-end PCM signal 60a and the outgoing far-end PCM signal 60b. The VAD 80 then makes a decision regarding a level of voice activity at the near end based at least in part on the degree of similarity between the spectral characteristics of the near-end signal 60a and the spectral characteristics of the far-end signal 60b.

Figure 9:
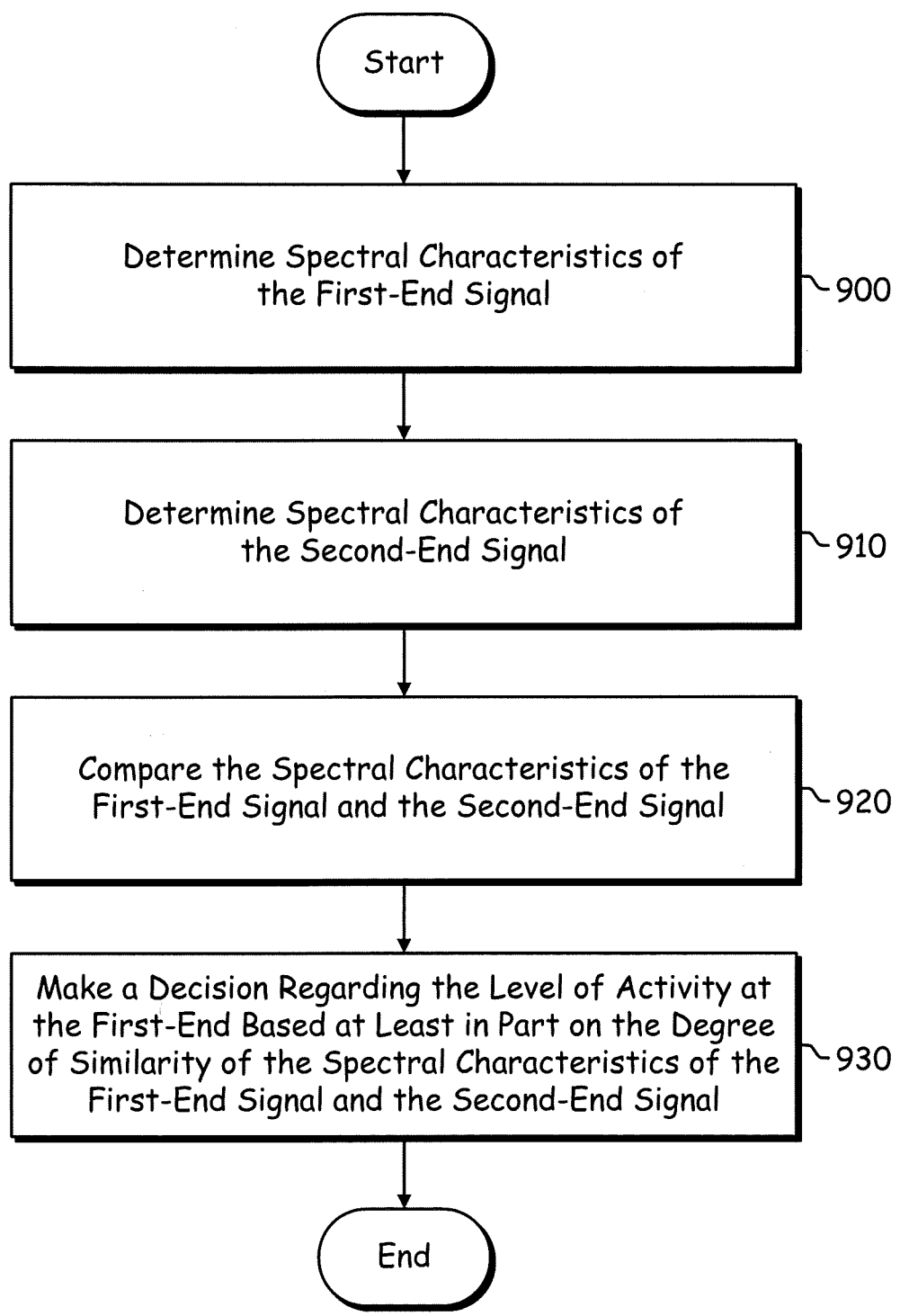
FIG. 9 is a flowchart representing a method of managing a communication system according to an illustrative embodiment of the present invention.

FIG. 9 is a flowchart representing a method of managing a. communication system according to an illustrative embodiment of the present invention. At step 900, the spectral characteristics of a first-end signal, such as incoming PCM signal 60a, are determined. At step 910, the spectral characteristics of a second-end signal, such as outgoing PCM signal 60b, are determined. At step 920, the spectral characteristics of the first-end signal are compared to the spectral characteristics of the second-end signal. At step 930, a decision is made regarding the level of activity at the first end based at least in part on the degree of similarity between the spectral characteristics of the first-end signal and the spectral characteristics of the second-end signal.

Figure 10:
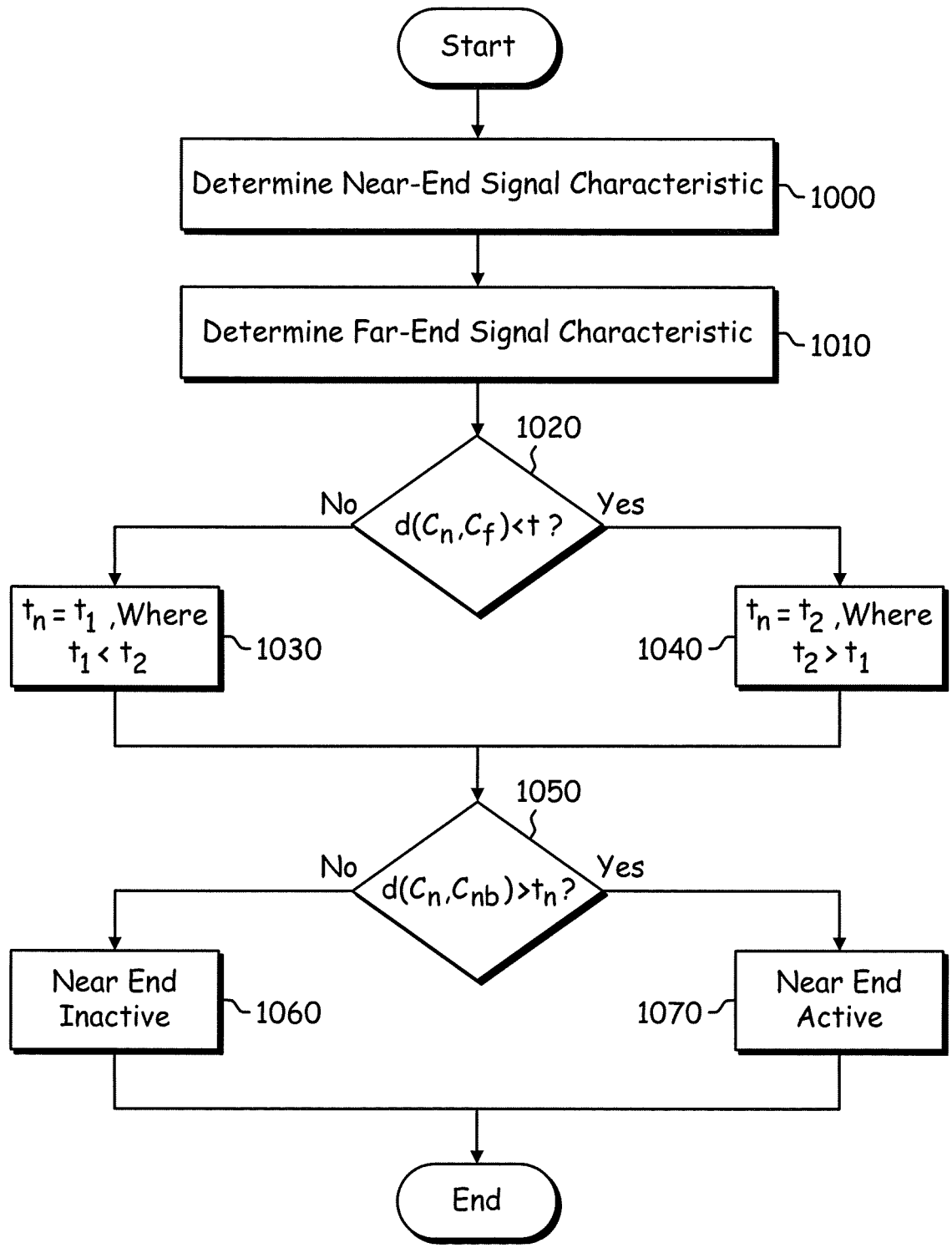
FIG. 10 is a flowchart representing a method of managing a communication system according to an illustrative embodiment of the present invention.

FIG. 10 is a flowchart representing a method of managing a communication system according to an illustrative embodiment of the method represented in FIG. 9. At step 1000, a signal characteristic of the incoming near-end signal 60a is measured. At step 1010, the corresponding signal characteristic of the outgoing far-end signal 60b is measured. Signal characteristics that may be employed include energy, power, spectral characteristics and non-linear characteristics. At decision block 1020, a distortion value $d(C_n, C_f)$ indicative of a distortion between the near-end signal characteristic and the far-end signal characteristic is evaluated. If the distortion value $d(C_n, C_f)$ is greater than a predetermined threshold t, echo is deemed not significantly present in the near-end signal and a near-end threshold, $t_n$, is set to a first threshold level, $t_1$, as shown at step 1030. At step 1040, if the distortion value $d(C_n, C_f)$ is less than the predetermined threshold t, echo is significantly present in the near-end signal and a near-end threshold, $t_n$, is set to a second threshold level, $t_2$, which represents a higher threshold than the first threshold level $t_1$. At decision block 1050, a distortion value $d(C_n, C_{nb})$ indicative of a distortion between the near-end signal characteristic and the corresponding near-end background noise signal characteristic is compared to the near-end threshold, $t_n$. If the distortion value $d(C_n, C_{nb})$ is less than $t_n$, the near-end is declared inactive, as shown at step 1060. At step 1070, if the distortion value $d(C_n, C_{nb})$ is greater than $t_n$, the near-end is declared active. In an illustrative embodiment, the second near-end threshold $t_{n2}$ is approximately 10 dBm greater than the first near-end threshold $t_{n1}$.

Background Noise Estimator

The background noise estimator 65 contains means for monitoring the incoming near-end PCM signal 60a and means for estimating a level of background noise present in the near-end signal 60a. The background noise estimate can be affected by activity in the outgoing far-end PCM signal 60b. Therefore, in an illustrative embodiment of the present invention, the background noise estimator 65 includes means for monitoring the far-end signal 60b. The background noise estimator 64 further includes means for manipulating the background noise estimate based upon a characteristic of the far-end signal.

Figure 11:
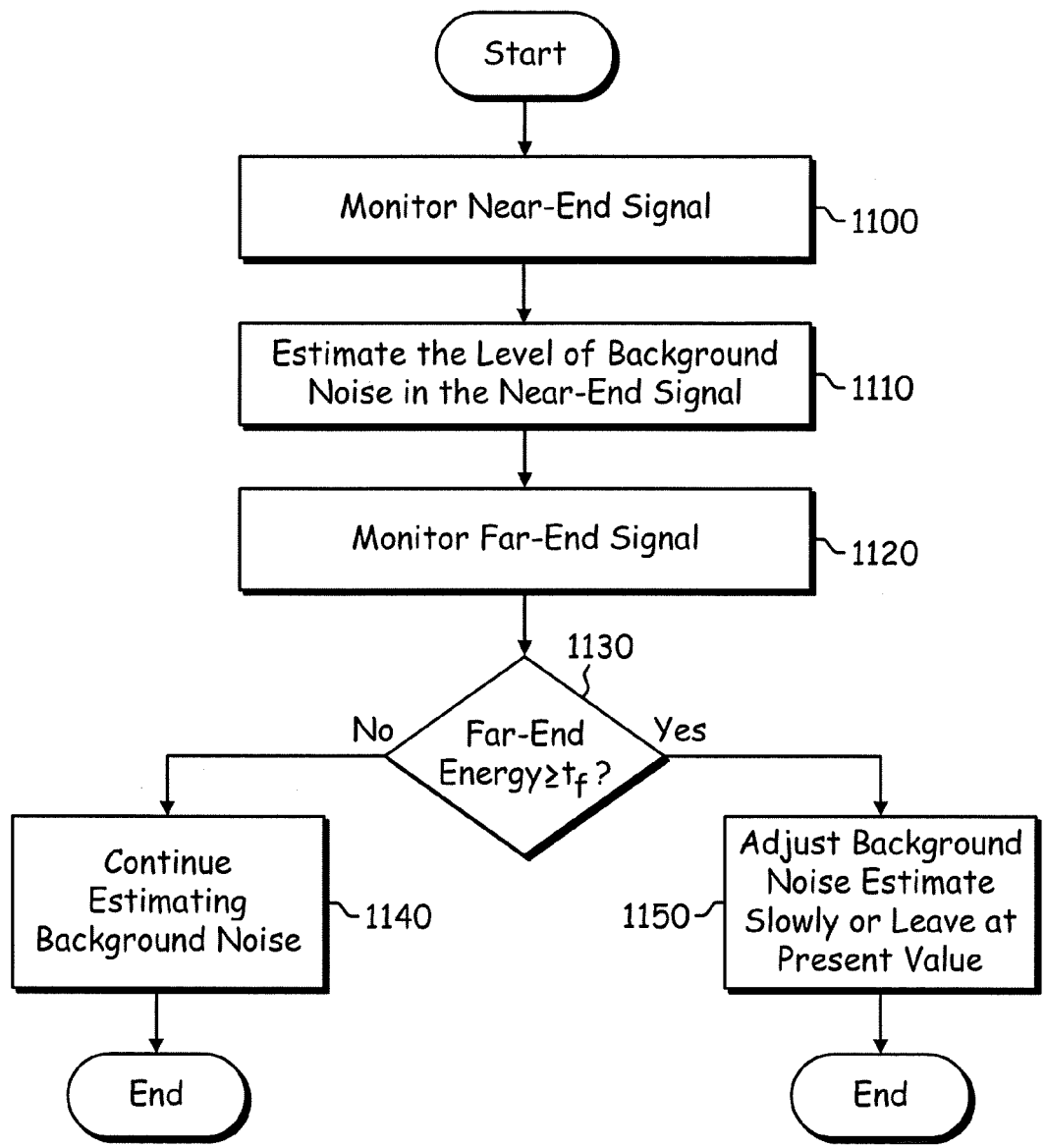
FIG. 11 is a flowchart representing a method of managing a communication system according to an illustrative embodiment of the present invention.

FIG. 11 is a flowchart representing a method of managing a communication system according to an illustrative embodiment of the present invention. At step 1100, the near-end signal 60a is monitored. At step 1110, the amount of background noise in the near-end signal is estimated. At step 1120, the far-end signal 60a is monitored. At step 1130, the energy level of the far-end signal is compared to a far-end threshold, $t_f$. If the energy of the far-end signal is less than $t_f$, the far end is deemed inactive and the background noise estimator 64 continues estimating the background noise, as shown at step 1140. At step 1150, if the energy of the far-end signal is greater than or equal to $t_f$, the far end is deemed active and the background noise estimator adjusts its estimating of the background noise more slowly or leaves the estimate at its present value. In an exemplary embodiment, adjusting step 1150 comprises freezing the background noise estimate at the level it is at when far-end activity is detected. In an alternative embodiment, when far-end activity is detected, the update rate (the rate at which the background noise estimator updates the background noise estimate) of the background noise estimator 65 is reduced. Alternatively, when far-end activity is not detected, the update rate of the background noise estimator 65 can be increased relative to times when far-end activity is detected.

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of managing a communication system having a first end and a second end, comprising steps of:
    (a) monitoring a respective level of voice activity at the second end; and
    (b) making a decision regarding a corresponding level of voice activity at the first end based at least in part on the respective level of voice activity at the second end.

2. The method of claim 1 wherein monitoring step (a) comprises receiving a second-end voice activity signal indicative of the respective level of voice activity at the second end and making step (b) comprises making the decision regarding the corresponding level of voice activity at the first end based at least in part on the second-end voice activity signal.

3. The method of claim 1 wherein monitoring step (a) comprises determining whether the second end is active or inactive and wherein making step (b) comprises making the decision regarding the corresponding level of voice activity at the first end based at least in part on whether the second end is active or inactive.

4. The method of claim 1 wherein making step (b) comprises deciding whether the first end is active or inactive based at least in part on the respective level of voice activity at the second end.

5. The method of claim 1 wherein making step (b) comprises deciding whether the first end is voice-active or voice-inactive based at least in part on the respective level of voice activity at the second end.

6. A method of managing a communication system having first and second ends, comprising steps of:
    (a) monitoring a first signal representing a voice activity level at the first end;
    (b) estimating a level of background noise present in the first signal;
    (c) monitoring a second signal representing the voice activity level at the second end; and
    (d) manipulating the level of the background noise based upon a characteristic of the second signal.

7. A communication system having a first end and a second end and comprising:
    a signal estimator adapted to estimate a respective level of voice activity at the second end; and
    an activity detector adapted to make a decision regarding a corresponding level of voice activity at the first end based at least in part on the respective level of voice activity at the second end.

8. A background noise estimator in a communication system having first and second ends, comprising:
    a first monitoring means for monitoring a first signal at the first end;
    an estimating means for estimating a level of background noise present in the first signal;
    a second monitoring means for monitoring a second signal at the second end; and
    a manipulating means for manipulating the level of background noise based upon a characteristic of the second signal.

* * * * *